United States Patent [19]
Sherrick et al.

[11] Patent Number: 5,618,606
[45] Date of Patent: Apr. 8, 1997

[54] PROCESS FOR BONDING STAGED COMPOSITES WITH A COBONDED STAGED ADHESIVE AND ARTICLE

[75] Inventors: George O. Sherrick, Tulsa, Okla.; Robert A. Susnik, Pittsburg, Kans.

[73] Assignee: Rockwell International Corporation, Seal Beach, Calif.

[21] Appl. No.: 408,571

[22] Filed: Sep. 18, 1989

[51] Int. Cl.$^6$ ............................................. B32B 5/12
[52] U.S. Cl. ........................... 428/113; 428/117; 428/408; 156/286; 156/330
[58] Field of Search ................................... 428/113, 117, 428/408; 156/330, 243, 299, 286

[56] References Cited

U.S. PATENT DOCUMENTS

| | | | |
|---|---|---|---|
| 4,231,169 | 11/1980 | Toyama et al. | 36/43 |
| 4,254,186 | 3/1981 | Acitelli et al. | 428/462 |
| 4,309,473 | 1/1982 | Minamisawa et al. | 428/292 |
| 4,560,428 | 12/1985 | Sherrick et al. | 156/94 |
| 4,701,378 | 10/1987 | Bagga et al. | 428/414 |
| 4,824,500 | 4/1989 | White et al. | 156/94 |
| 4,900,601 | 2/1990 | Hälg et al. | 428/68 |

Primary Examiner—Ngoclan Mai
Attorney, Agent, or Firm—Charles T. Silberberg; Max Geldin

[57] ABSTRACT

A process for producing a fiber reinforced, staged resin composite or repair patch containing a staged and cobonded adhesive, comprises providing a composite or patch formed of one or more layers of a fiber reinforced thermosetting resin such as a graphite-epoxy material and applying a layer of a thermosetting resin adhesive, e.g. an epoxy adhesive, to a surface of the fiber reinforced resin material. The arrangement is then placed in a vacuum environment such as a nonautoclave tool, to draw off volatiles from the resin, and the temperature is raised under conditions to stage the thermosetting resin of the adhesive and of the composite or patch, and cobonding the staged adhesive to the staged composite or patch. The resulting cobonded and staged composite-adhesive can be stored until ready for use, e.g. in repairing a damaged substrate. For this purpose the repair patch formed of the staged composite-adhesive is placed with the adhesive layer in contact with the damaged substrate surface, and the arrangement heated at elevated temperature to cure the resin and bond the repair patch to the substrate surface.

14 Claims, 1 Drawing Sheet

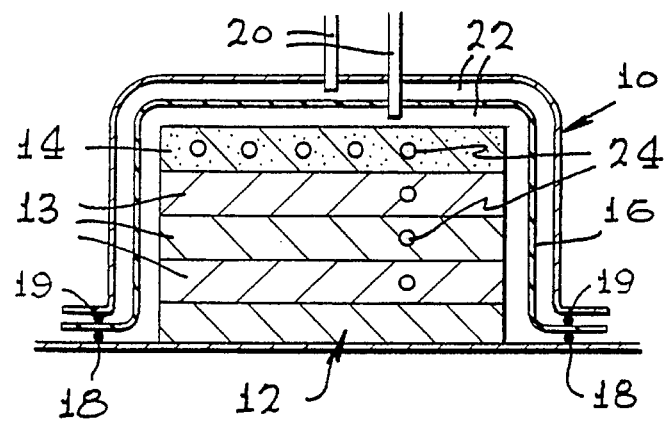
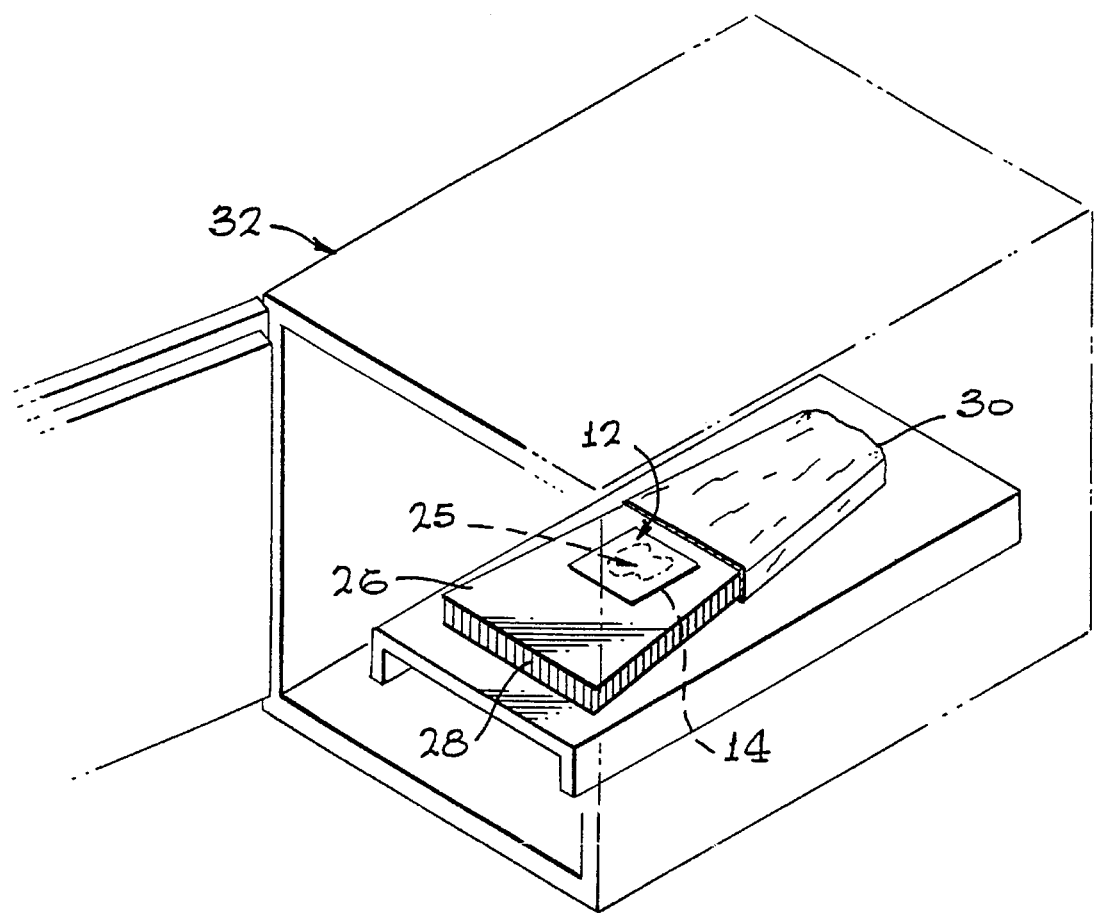

PROCESS FOR BONDING STAGED COMPOSITES WITH A COBONDED STAGED ADHESIVE AND ARTICLE

BACKGROUND OF THE INVENTION

This invention relates to a process for producing composites cobonded with a staged adhesive, and is particularly concerned with a process for cobonding and staging together a composite in the form of a repair patch and an adhesive applied directly thereto, to form a staged laminate which can be applied to a damaged area of a substrate, e.g. a damaged aircraft component, and the laminate cured by elevated temperature heating to bond the repair patch or laminate to the substrate.

A system and method for producing a composite particularly applicable for repairing damage to a structural component such as an aircraft component, is disclosed in U.S. Pat. No. 4,560,428 to Sherrick, et al. According to the patent, a patch to be integrally connected to the parent material and comprising a fiber reinforced component such as graphite impregnated with a thermosetting resin such as an epoxy resin, is partially cured, e.g. "B" staged. A layer or film of heat bondable adhesive such as a "B" staged epoxy resin adhesive, is placed between the patch and the parent material to be repaired. The entire assembly is then cured, e.g. employing a vacuum bag cure cycle, to cure the staged epoxy resin of the patch and of the adhesive layer to effect integral bonding of the patch to the parent material.

One disadvantage of this prior art method is that the staged adhesive as well as the staged composite or patch require storage separately prior to use, usually at reduced temperature, to avoid further reaction of the staged resin. Further, the stored adhesive usually requires defrosting and trimming prior to use and it is also necessary to prepare the patch surface for bonding with the adhesive. Another disadvantage is that if the staged adhesive employed in the above patent process is not devolatilized, the volatiles from the adhesive can penetrate back into the patched material during curing, and create a porous laminate. Another problem is maintaining bondline thickness during cure.

U.S. Pat. No. 4,357,193 to McGann, et al discloses a method of fabricating a composite wherein a laminate comprising a plurality of plies of fibrous material in an uncured resin such as graphite-epoxy is placed in a vacuum chamber and a partial vacuum is created in the chamber. The laminate is heated to within a temperature range wherein the resin matrix exhibits a viscosity which allows air migration through the resin matrix. The laminate is maintained within such temperature range for a time sufficient to expel entrapped air in the laminate.

It is accordingly an object of the present invention to provide a process which results in a high strength adhesive which in the staged condition exhibits prolonged room temperature storability, and which is an integral part of the secondarily bonded element, e.g. a repair patch.

Another object is to develop a process of the above type wherein the adhesive is devolatilized prior to bonding to a composite element, such as a repair patch.

A still further object is the provision of a staged laminate having a staged adhesive bonded thereto, and which is storable and ready for use to repair a damaged substrate, by curing.

SUMMARY OF THE INVENTION

The above objects are achieved according to the invention by the provision of a process for applying a conventional adhesive to a composite such as a resin impregnated fibrous material composite, and staging both the adhesive and the resin composite to cobond the adhesive to the composite. The staging operation is carried out in a vacuum environment such as a nonautoclave tool to remove volatiles from the adhesive prior to such cobonding. The resulting cobonded laminate, e.g. in the form of a staged adhesive cobonded to a staged composite, as in the form of a patch, can be applied to a substrate such as the damaged area of an aircraft, and the cobonded staged composite and staged adhesive cured using a controllable heat source such as a heating blanket or oven, to secure the composite or patch to the substrate or damaged area.

More particularly, a process is provided for producing a composite according to the invention, which comprises providing a fiber reinforced thermosetting resin material, applying a thermosetting resin adhesive to a surface of such material, devolatilizing such adhesive, and staging said resin material and said adhesive to form a staged cobonded laminate, capable of being cured by heating at elevated temperature.

Such devolatilizing and staging are carried out by placing the laminate of fiber reinforced thermosetting resin material containing the adhesive in a vacuum environment, such as a nonautoclave tool, removing air from the tool and drawing off volatiles from the adhesive, and heating the laminate to a temperature and for a period of time sufficient to stage the laminate.

The last step is an in-situ cure of the staged cobonded laminate or repair patch and the staged adhesive, employing a controlled heat source such as a heating blanket or oven.

Cobonding the adhesive to the patch eliminates the need to store separately the staged adhesive and the staged patch at reduced temperatures, and to defrost and trim the staged adhesive and to prepare the separate patch surface for bonding, as in the prior art such as above U.S. Pat. No. 4,560,428 thus eliminating steps in the bonding operation. The unitary cobonded staged laminate or patch, containing staged adhesive according to the present invention, can be stored as a unit and when it is to be used, this unit can be applied to the part or substrate to be repaired and the cobonded patch and adhesive can be cured to bond the patch to the part.

The devolatilization and staging operation removes volatiles from the adhesive as well as the matrix resin of the composite or patch, prior to bonding, thus reducing entrapped porosity. Staging aids in elevating the glass transition temperature (Tg) of the material sufficiently high to allow prolonged room temperature storage of the staged and cobonded laminate. Testing has indicated high lap shear strength of the cured laminate.

DESCRIPTION OF THE DRAWINGS

FIG. 1 illustrates placement of a repair patch containing a thermosetting adhesive in a noautoclave tool for staging the laminate; and FIG. 2 illustrates placement of the staged laminate or repair patch on the damaged skin area of an aircraft component and placement of the assembly in an oven for curing the repair patch and securing same to the skin.

DETAILED DESCRIPTION OF INVENTION AND PREFERRED EMBODIMENTS

The composite or patch to which the adhesive is applied can be formed of one or more layers of fiber reinforced components such as graphite fibers impregnated with a tough viscous polymer which is thermosetting such as epoxy or epoxy-novolac resin. Other fibrous materials which can be employed include for example fiberglass and other available fibers such as Kevlar, which is a poly(paraphenyl-terephthalamide).

The adhesive which is employed in combination with the fiber impregnated resin composite, can be for example an epoxy resin adhesive which when cured aids in bonding the composite or patch to the substrate material upon application of heat during curing.

To repair a damaged area of a substrate such as a graphite-epoxy composite member forming a structural component of an aircraft, a patch formed of one or more layers preferably of a graphite-epoxy material of a size corresponding to that of the damaged area, is provided. A layer of a thermosetting adhesive such as an epoxy adhesive is applied to a surface of the patch to be bonded to the damaged substrate. The resulting arrangement is placed in a vacuum environment, e.g. in a nonautoclave tool. The tool is heated and in the presence of the vacuum, devolatilization of the resin of the adhesive and of the resin matrix of the patch occurs, and the temperature is raised to a level where staging of the thermosetting adhesive and the thermosetting resin of the composite or patch occur. These thermosetting resins are thus partially cured, e.g. "B" staged, or between "B" and "C" staged, to permit subsequent final curing at substantially elevated temperature.

The staging operation requires that the materials, that is the adhesive and the composite or patch, be brought to a point where there is little or no polymer cross-linking, while at the same time reaching a temperature high enough to raise the Tg of the material above the expected storage ambient. Consolidation of the patch and adhesive takes place during the staging operation in the nonautoclave tool. Devolatilization occurs in an open environment during staging as opposed to entrapped devolatilization between inpermeable surfaces, which occurs during conventional secondary bond operation. Conventional secondary bonding refers to standard procedures of bonding using unstaged adhesive which is then cured to subsequently bond a cured patch to a parent material. As previously indicated, the invention process can be performed on any combination of stageable and compatible resins and adhesives.

A nonautoclave tool employed according to the invention for devolatilizing and staging of the resin as described above refers to a tool which functions in a vacuum environment as contrasted to an autoclave, which functions under a high positive pressure. Placing the composite or patch containing the adhesive in an autoclave would trap the volatiles within the composite during staging and result in a porous composite or patch after curing.

The cobonded staged patch and staged adhesive can be stored, e.g. at ambient temperature, until ready for use, or can be employed directly in the field in the repair process. In the repair process, the cobonded staged patch containing the staged adhesive is laid down on the part where the damage is located so as to match the contour of the damaged area. Local contouring can be provided, if necessary, using a local heat source such as a heat gun. Curing of the assembly can be accomplished in conventional manner employing a vacuum bag cure cycle for the resin and/or adhesive systems employed. Heat is applied from a heat source such as a heating blanket internal to the bag arrangement for a normal cure cycle, to secure the cured patch to the part.

The following are examples of practice of the invention.

EXAMPLE 1

An aircraft weapons bay door is damaged through its graphite/epoxy face sheets into the honeycomb core substructure. Damage size is approximately 10 sq. inches. Damage has occurred on a contoured area of the otherwise flat door.

A rapid repair is needed to get the part back into service as quickly as possible. The repair must also demonstrate a high level of structural integrity since the damaged area is in a critically loaded zone. The damaged area of the graphite/epoxy face sheets and honeycomb core is removed, leaving a circular area where skin and core are removed. A repair is made to the honeycomb using a standard procedure.

The external skin is repaired using a staged, cobonded nonautoclave patch. The patch is made and applied using the following procedural steps:

1. Febricate patch—cut plies of graphite reinforced epoxy corresponding to the damaged area of the door. Add an extra cover ply to the laminate. A layer of American Cyanamid FM300 epoxy adhesive is added to the inner surface of the patch.

2. Nonautoclave stage the patch—Place the patch material containing epoxy adhesive in a nonautoclave tool 10 as illustrated in FIG. 1 of the drawing. The laminate or patch formed of plies 13 of graphite-epoxy and having the adhesive layer 14 on one surface, is covered by a vacuum bag 16 sealed at 18 and 19 and containing vacuum outlets 20. Remove air from both chambers 22 shown in FIG. 1. Heat the tool in an oven and bring the patch 12 and adhesive layer 14 to a temperature of 240° F. for a period of 45 minutes while maintaining a full vacuum, thus staging the laminate 12 and adhesive 14, and devolatilizing same, as indicated at 24.

3. Repair preparation—Remove the tool 10 from the oven and place the staged patch 12 containing staged adhesive layer 14 in the repair area. Contour the patch with a heat gun by bringing the patch to a temperature of 220°–260° F. and forming with hand pressure. As illustrated in FIG. 2, the staged and contoured patch 12 containing staged adhesive layer 14 is placed on the damaged area 25 of external graphite/epoxy skin 26 on honeycomb core 28, with the adhesive layer 14 in contact with the skin 26 and the honeycomb core. The entire assembly is vacuum bagged at 30 and placed in an oven 32. Alternatively, a heat blanket can be applied in place of the use of an oven.

4. Final cure—Cure patch at 350° F. for one hour.

EXAMPLE 2

Similar damage situation to Example 1, except damage is large (greater than 100 sq. in.) and repair must be done at a depot.

A large repair is needed which will not result in porosity in the middle of the patch (caused by entrapment of volatiles when gelation occurs before devolatilization). The repair must also demonstrate a high level of structural integrity since the damaged area is in a critically loaded zone.

Repair—The damaged area is removed leaving a rectangular area where skin and core are removed. A repair is made to the honeycomb using a standard procedure.

The external skin is repaired using a staged, cobonded nonautoclave patch. The patch is made using the following steps:

1. Fabricate patch—cut plies of fiberglass reinforced epoxy to proper size. Add an extra cover ply to the laminate. Add two layers of FM300 epoxy adhesive to the inner surface of the patch.

2. Nonautoclave stage the patch—Same as in Example 1.

3. Repair preparation—Same as in Example 1.

4. Final cure—Cure patch at 350° F. for one hour in an oven.

EXAMPLE 3

Large areas of an aircraft horizontal stabilizer leading edge are damaged. The structure cannot be put back into the autoclave because of the possibility of collapsing the structure with pressure produced in the autoclave.

Three large repairs are needed which will not result in pressure failure of the structure. The repair must also demonstrate a high level of structural duplication since the damaged area is in a RAS/RAM critical area.

The damaged area is removed leaving three rectangular areas where graphite-epoxy skin and honeycomb core substructure are removed. A repair is made to the honey comb using a standard procedure.

The external skin is repaired using a staged, cobonded nonautoclave patch. The patch is made using the following steps.

1. Fabricate patch—cut plies of fiberglass reinforced epoxy to form a layup of the desired size shown on the horizontal stabilizer leading edge drawing. Orient the ply locations to exactly match that shown on the drawing. Add two layers of American Cyanamid FM300 epoxy adhesive to the inner surface of the patch.

2. Nonautoclave stage the patch—Same as in Example 1.

3. Repair preparation—Same as in Example 1.

4. Final cure—Cure part at 350° F. for one hour in an oven.

From the foregoing, it is seen that the invention provides a unique process for preparing a staged composite containing a staged thermosetting resin, which can be effectively employed as a repair material or patch for repairing damaged substrates, particularly damaged aircraft parts formed of a composite, e.g. a fiber reinforced resin such as graphite-epoxy material. The resulting staged composite or staged repair patch containing staged thermosetting resin can be readily stored at ambient temperature over extended time periods for subsequent use, or can be immediately employed for repair service.

According to the invention concept and process, the following important results are obtained:

1. The adhesive is devolatilized during staging, which eliminates porosity often seen in repairs, particularly in large area repairs.

2. A cobonded repair patch can drape as a unit over sharp contours (upon application of heat).

3. Repair patch kits may be stored at locations where refrigeration is unavailable (e.g. field or battle damage repair locations).

4. The cobonded patch can reduce several of the steps involved in repair thus allowing quick application to a bond surface in the field.

5. The cobonded adhesive prevents contamination of the nonautoclave patch surface; this surface cannot be readily cleaned with solvents or sanded in the staged condition.

6. The staged adhesive can provide lap shear strength equal to autoclave cured adhesives. The cobonded interface may also provide increased strength due to cross-linking between resin and adhesive.

7. Since the adhesive is devolatilized and consolidated only minimal pressure is required to hold the patch in position during cure. This is useful in controlling bondline thickness and in eliminating "squeeze out" around the periphery of a repair patch.

Since various modifications of the invention will occur to those skilled in the art, the invention is not to be taken as limited except by the scope of the appended claims.

What is claimed is:

1. A process for producing a composite, which comprises
providing a fiber reinforced thermosetting resin material,
applying a thermosetting resin adhesive to a surface of said material,
devolatilizing said adhesive, and
staging said resin material and said adhesive to form a staged cobonded laminate capable of being cured by heating at elevated temperature.

2. The process of claim 1, wherein said devolatilizing and staging are carried out by placing said laminate in a vacuum environment, removing air and drawing off volatiles from said adhesive, and heating said laminate to a temperature sufficient to form said staged cobonded laminate.

3. The process of claim 2, including placing said staged laminate on a substrate, with the staged adhesive of said laminate in contact with said substrate, and curing said laminate to adhere same to said substrate.

4. The process of claim 2, wherein said fiber reinforced thermosetting resin material is a graphite fiber or fiberglass reinforced epoxy resin and said thermosetting resin adhesive is an epoxy resin adhesive.

5. The process of claim 3, wherein said fiber reinforced thermosetting resin material is a graphite fiber or fiberglass reinforced epoxy resin, said thermosetting resin adhesive is an epoxy resin adhesive, and said substrate is a composite material.

6. The process of claim 5, wherein said composite material is a graphite fiber reinforced epoxy or epoxy-novolac resin.

7. A process for producing a fiber reinforced staged resin repair patch containing a staged and cobonded adhesive which comprises
providing a patch formed of one or more layers of a fiber reinforced thermosetting resin material,
applying a layer of a thermosetting resin adhesive to a surface of said patch,
placing said patch containing said adhesive in a nonautoclave tool,
removing air from said tool and drawing off volatiles from said adhesive, and
heating said patch containing said adhesive under conditions to stage the thermosetting resin of said adhesive and of said patch and cobonding said staged adhesive to said staged patch.

8. The process of claim 7, wherein said fiber reinforced thermosetting resin material is a graphite fiber or fiberglass reinforced epoxy resin and said thermosetting resin adhesive is an epoxy resin adhesive.

9. A process for repairing a substrate having a damaged area, which comprises
placing the cobonded staged repair patch containing staged adhesive of claim 7 over the damaged area of said substrate with said staged adhesive in contact with the substrate surface, and heating the cobonded repair patch and adhesive at elevated temperature to cure the thermosetting resin of said repair patch and said adhesive, and securing said repair patch to said substrate.

10. The process of claim 9, wherein said fiber reinforced thermosetting resin material is a graphite fiber or fiberglass reinforced epoxy resin and said thermosetting resin adhesive is an epoxy resin adhesive.

11. A fiber reinforced resin composite containing a staged adhesive, capable of storage under ambient conditions, which consists essentially of a composite formed of a fiber reinforced staged thermosetting resin having cobonded thereto a devolatilized staged thermosetting resin adhesive, and capable of being cured at elevated temperature.

12. The article of claim 11, wherein said composite is a repair patch suitable for application to a damaged substrate.

13. The article of claim 11, wherein said fiber reinforced thermosetting resin material is a graphite fiber or fiberglass reinforced epoxy resin and said thermosetting resin adhesive is an epoxy resin adhesive.

14. The article of claim 12, wherein said repair patch comprises one or more layers of a graphite fiber reinforced epoxy resin.

* * * * *